Figures 1, 2:
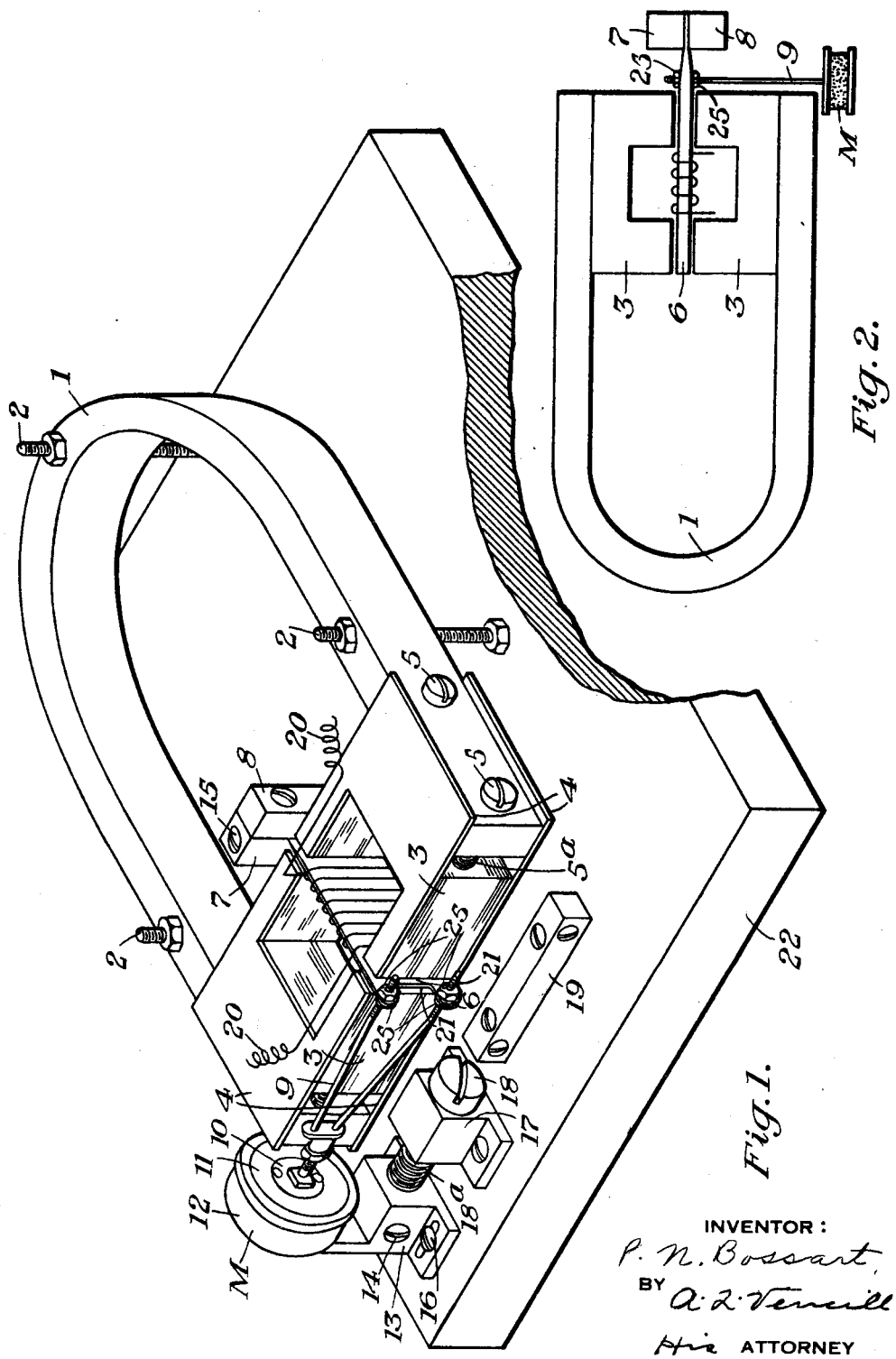

Feb. 19, 1929.  1,702,428
P. N. BOSSART
MICROPHONE AMPLIFIER
Original Filed April 18, 1925

INVENTOR:
P. N. Bossart,
BY
His ATTORNEY

Patented Feb. 19, 1929.

UNITED STATES PATENT OFFICE.

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

MICROPHONE AMPLIFIER.

Application filed April 18, 1925, Serial No. 24,204. Renewed July 10, 1928.

My invention relates to microphone amplifiers, and has for an object the provision of an improved device of the vibrating armature microphone type characterized by increased efficiency and sensitiveness.

I will describe two forms of amplifiers embodying my invention, and will then point out the novel features thereof in claim.

In the accompanying drawing, Fig. 1 is a view showing in isometrical projection one form of microphone amplifier embodying my invention. Fig. 2 is a plan view showing a modification of the amplifier shown in Fig. 1 and also embodying my invention.

Referring first to Fig. 1, the operating parts of the device are mounted on a base plate 22 provided with three upstanding screws 2. These screws support a U-shaped field member 1, which, as here shown, is a permanent magnet but may equally well be an electromagnet. Associated with the two legs of this field member 1 are two U-shaped pole members 3, which are so mounted with respect to the field member that the two poles of each pole member confront the two poles of the other member. Each pole member 3 slides with two outside plates 4 of electrical sheet steel, which are attached to the pole members so as to slide over the poles of the permanent magnet 1. The inner end of each of these plates is recessed to conform substantially to the shape of the corresponding pole member 3. The two plates 4 associated with each pole member serve to guide the pole member as it slides, and they also serve to conduct magnetic flux between the pole member and the associated leg of the field member 1.

The reference character 6 designates the armature of the relay, which armature is located between the confronting poles of the two pole members 3. The inner end of this armature as here shown is reduced in thickness, although this reduction is not needed in all cases, and is rigidly clamped between two armature supports 7 and 8 fixed to the base plate 22. It will be seen, therefore, that the amature is free to vibrate in the spaces between the poles of the pole members 3, and that its axis of vibration is beyond the inner pair of poles of these members. The thickness of the main body of the armature 6 may, for example, be .014″, whereas the thickness of the inner end of this armature may be .004″.

The armature 6 is provided with a winding 20 which surrounds that portion of the armature lying between the poles of the pole members 3, but which is fixed to the base plate 22 and is out of contact with any part of the armature. This winding is illustrated diagrammatically in the drawing, but in practice it is supported by a block 19 which is attached to the base plate 22.

Each pole member 3 is provided with a pair of adjusting screws 5 which are tapped into the pole member and pass with clearance through holes in the field member 1. A coil spring $5^a$ surrounds each of these screws between the pole member and the field member. By suitable adjustment of the screws 5 the air gaps between the armature 6 and each pole of each pole member 3 may be properly adjusted. This adjusting feature may not always be needed, and can be omitted when the armature is adjustably connected with the microphone as hereinafter described.

The reference character M designates a microphone comprising the usual microphone case 12, a mica diaphragm 11, and a diaphragm clamping nut 10. The diaphragm 11 is operatively connected with the armature 6 by means of a Y-shaped member 9. The left hand end of this member is attached to the diaphragm clamping nut 10, and each arm of the other or forked end is threaded and passes with clearance through a hole in the armature. The armature is clamped between two nuts 25 on each arm, so that by varying the positions of these nuts the air gaps between the armature and the pole members may be varied. The parts are so adjusted that with no current in winding 20 the armature remains at rest in its mid-position between the two pairs of pole faces of pole members 3. When this adjustment is provided the pole members 3 may be fixed with respect to the permanent magnet 1, and the microphone M may be fixed to the base plate 22, thus eliminating the adjusting screws 5, and also the adjusting screw 18 hereinafter described. Furthermore, the Y-shaped member 9 stiffens the armature, and prevents it from being twisted across the pole faces and sticking.

As here shown, the microphone M is fixed to a microphone support 13 which is in turn adjustably attached to the base plate 22 by screws 16 co-operating with slots in the support 13. A microphone adjusting block 17 is attached to the base plate 22 and is provided with a horizontal hole which receives an adjusting screw 18 with clearance. This adjusting screw is tapped into the microphone support 13 and carries a coil spring 18a between the adjusting block 17 and the microphone support 13. By turning the screw 18 the distance between the microphone M and the magnetic structure of the relay may be very accurately adjusted.

It will be noted that the reed hinge support of armature 6 avoids pivots and moving frictional surfaces and provides a readily accessible support for inspection, adjustment and repair. It reduces motional losses in the armature to a minimum, and permits of obtaining large forces by utilizing lever arm ratios.

Referring now to Fig. 2, the device shown in this view is substantially the same as that shown in Fig. 1, except that the armature 6 is mounted at a point outside of the outer confronting poles of the magnetic system, and the member 9 which operates the microphone M is attached to the armature at a point near the armature support. In this view the two pole members 3 are illustrated in direct contact with the legs of the field member 1, but if desired, the means shown in Fig. 1 for connecting these pole members with the field member may be used.

The structure shown in Fig. 2 is advantageous when large forces and slight motions are desired, as for example, when a relatively large microphone is to be used. Since very minute movements are sufficient for microphone operation, the structure shown in Fig. 2 may be more satisfactory than that shown in Fig. 1.

The amplifiers illustrated herein may be designed for a greatly increased armature force by using an electromagnet instead of a permanent magnet for the field member 1, and the alternating current resistance of the relay may be decreased by laminating the armature 6. The operating coil 20 surrounding the armature 6 may be replaced by coils surrounding the legs of the pole members 3.

Although I have herein shown and described only two forms of amplifiers embodying my invention, it is understood that various changes and modifications may be made therein within the scope of the appended claim without departing from the spirit and scope of my invention.

Having thus described my invention, what I claim is:

A microphone amplifier comprising a U-shaped field member, a pair of U-shaped pole members associated with the two legs of said field member respectively and so mounted that the two poles of each member confront the two poles of the other member, an armature located between said poles and supported at one end whereby the armature is free to vibrate between said poles, a microphone, a connecting member attached to said microphone and having a forked end each arm of which is threaded and passes with clearance through a hole in said armature, and nuts co-acting with said threaded ends of the connecting member to clamp the armature to the member and permit adjustment of the armature with respect to said pole members.

In testimony whereof I affix my signature.

PAUL N. BOSSART.